(12) United States Patent
Proctor et al.

(10) Patent No.: US 9,072,061 B2
(45) Date of Patent: Jun. 30, 2015

(54) TELECOMMUNICATIONS NETWORKS AND DEVICES

(75) Inventors: Toby Proctor, Newbury (GB); Youssef Chami, Newbury (GB)

(73) Assignee: VODAFONE GROUP PLC, Berkshire (GB)

( * ) Notice: Subject to any disclaimer, the term of this patent is extended or adjusted under 35 U.S.C. 154(b) by 1054 days.

(21) Appl. No.: 12/450,649

(22) PCT Filed: Apr. 4, 2008
(Under 37 CFR 1.47)

(86) PCT No.: PCT/GB2008/050244
§ 371 (c)(1),
(2), (4) Date: May 3, 2010

(87) PCT Pub. No.: WO2008/122824
PCT Pub. Date: Oct. 16, 2008

(65) Prior Publication Data
US 2011/0076998 A1  Mar. 31, 2011

(30) Foreign Application Priority Data

Apr. 5, 2007  (GB) .................................. 0706781.2
Apr. 26, 2007  (GB) .................................. 0708116.9

(51) Int. Cl.
| | | |
|---|---|---|
| *H04W 24/00* | (2009.01) |
| *H04W 52/28* | (2009.01) |
| *H04W 52/32* | (2009.01) |
| *H04W 52/50* | (2009.01) |
| *H04B 17/27* | (2015.01) |
| *H04B 17/327* | (2015.01) |
| *H04W 16/32* | (2009.01) |

(52) U.S. Cl.
CPC ............ *H04W 52/283* (2013.01); *H04W 16/32* (2013.01); *H04W 52/325* (2013.01); *H04W 52/50* (2013.01); *H04B 17/27* (2015.01); *H04B 17/327* (2015.01)

(58) Field of Classification Search
CPC .............................. H04W 24/00; H04W 52/24
USPC ................................................ 455/423, 67.11
See application file for complete search history.

(56) References Cited

U.S. PATENT DOCUMENTS

| | | | | |
|---|---|---|---|---|
| 6,243,591 B1 * | 6/2001 | Takemura | ...................... | 455/522 |
| 6,317,435 B1 * | 11/2001 | Tiedemann et al. | .......... | 370/441 |
| 6,339,697 B1 * | 1/2002 | Ranta | ........................... | 455/63.1 |
| 6,463,296 B1 * | 10/2002 | Esmailzadeh et al. | ........ | 455/522 |

(Continued)

FOREIGN PATENT DOCUMENTS

| | | |
|---|---|---|
| EP | 1 689 094 A2 | 8/2006 |
| WO | WO2006/010958 A2 | 2/2006 |

*Primary Examiner* — Hai V Nguyen
(74) *Attorney, Agent, or Firm* — Knobbe, Martens, Olson & Bear LLP

(57) ABSTRACT

A mobile telecommunications network, such as a GSM, UMTS or LTE network, may include, in addition to the conventional radio access network comprising the base stations, one or more additional access points. An access point may be connected to the network core by an IP transport broadband connection. The access point may be configured to appear to the mobile terminal as a conventional base station. Arrangements are disclosed which allow the access point to dynamically adjust the power output through its Common Pilot Channel relative to one or more users. In other words, the greater the distance a user is from the access point, the greater the output power.

11 Claims, 3 Drawing Sheets

(56) References Cited

U.S. PATENT DOCUMENTS

| | | | |
|---|---|---|---|
| 6,496,700 B1* | 12/2002 | Chawla et al. | 455/435.2 |
| 6,873,856 B2* | 3/2005 | Voyer | 455/522 |
| 6,879,840 B2* | 4/2005 | Razavilar et al. | 455/522 |
| 7,228,135 B2* | 6/2007 | Gromakov et al. | 455/440 |
| 7,308,268 B2* | 12/2007 | Barbosa da Torre et al. | 455/446 |
| 7,315,745 B2* | 1/2008 | Duffett-Smith et al. | 455/456.1 |
| 7,373,148 B2* | 5/2008 | Kim et al. | 455/437 |
| 7,373,161 B2* | 5/2008 | Anderson | 455/522 |
| 7,508,778 B2* | 3/2009 | Yafuso | 370/282 |
| 7,606,334 B2* | 10/2009 | D'Amico et al. | 375/340 |
| 7,656,967 B2* | 2/2010 | Tiirola et al. | 375/316 |
| 8,036,296 B2* | 10/2011 | Botha et al. | 375/267 |
| 8,064,834 B2* | 11/2011 | Kim et al. | 455/45 |
| 8,290,527 B2* | 10/2012 | Richardson | 455/522 |
| 8,301,925 B2* | 10/2012 | Tolentino | 713/321 |
| 8,488,477 B2* | 7/2013 | Li et al. | 370/252 |
| 8,503,342 B2* | 8/2013 | Richardson | 370/311 |
| 2001/0004597 A1* | 6/2001 | Hirahara | 455/442 |
| 2002/0028691 A1* | 3/2002 | Moulsley et al. | 455/522 |
| 2002/0119798 A1* | 8/2002 | Hamabe | 455/522 |
| 2002/0131387 A1* | 9/2002 | Pitcher et al. | 370/338 |
| 2002/0142788 A1* | 10/2002 | Chawla et al. | 455/504 |
| 2003/0033394 A1* | 2/2003 | Stine | 709/222 |
| 2003/0100311 A1* | 5/2003 | Chung et al. | 455/453 |
| 2003/0100312 A1* | 5/2003 | Takahashi | 455/453 |
| 2003/0104831 A1* | 6/2003 | Razavilar et al. | 455/522 |
| 2004/0160921 A1* | 8/2004 | Kaipainen et al. | 370/335 |
| 2004/0242257 A1* | 12/2004 | Valkealahti et al. | 455/522 |
| 2004/0253955 A1* | 12/2004 | Love et al. | 455/442 |
| 2006/0176865 A1* | 8/2006 | Cho | 370/338 |
| 2007/0036243 A1* | 2/2007 | D'Amico et al. | 375/340 |
| 2007/0116034 A1 | 5/2007 | Bridge et al. | |
| 2007/0149186 A1* | 6/2007 | Barbosa da Torre et al. | 455/423 |
| 2008/0009305 A1* | 1/2008 | Li et al. | 455/522 |
| 2008/0069020 A1* | 3/2008 | Richardson | 370/311 |
| 2008/0069028 A1* | 3/2008 | Richardson | 370/328 |
| 2008/0162926 A1* | 7/2008 | Xiong et al. | 713/155 |
| 2008/0253550 A1* | 10/2008 | Ch'ng et al. | 379/207.13 |
| 2008/0254792 A1* | 10/2008 | Ch'ng | 455/435.1 |
| 2009/0034440 A1* | 2/2009 | Samar et al. | 370/310 |
| 2009/0082020 A1* | 3/2009 | Ch'ng et al. | 455/435.3 |
| 2009/0088155 A1* | 4/2009 | Kim | 455/435.1 |
| 2009/0116445 A1* | 5/2009 | Samar et al. | 370/331 |
| 2009/0154447 A1* | 6/2009 | Humblet | 370/350 |
| 2009/0156165 A1* | 6/2009 | Raghothaman et al. | 455/411 |
| 2009/0156195 A1* | 6/2009 | Humblet | 455/422.1 |
| 2009/0156218 A1* | 6/2009 | Garg et al. | 455/442 |
| 2009/0163202 A1* | 6/2009 | Humblet et al. | 455/432.1 |
| 2009/0163216 A1* | 6/2009 | Hoang et al. | 455/450 |
| 2009/0163238 A1* | 6/2009 | Rao et al. | 455/522 |
| 2009/0164547 A1* | 6/2009 | Ch'ng et al. | 709/201 |
| 2009/0168766 A1* | 7/2009 | Eyuboglu et al. | 370/353 |
| 2009/0168788 A1* | 7/2009 | Den et al. | 370/401 |
| 2009/0170440 A1* | 7/2009 | Eyuboglu et al. | 455/63.3 |
| 2009/0170475 A1* | 7/2009 | Ch'ng et al. | 455/411 |
| 2009/0170520 A1* | 7/2009 | Jones | 455/439 |
| 2009/0170547 A1* | 7/2009 | Raghothaman et al. | 455/522 |
| 2009/0172169 A1* | 7/2009 | Ramaswamy et al. | 709/227 |
| 2009/0172397 A1* | 7/2009 | Kim | 713/168 |
| 2009/0186626 A1* | 7/2009 | Raghothaman | 455/452.2 |
| 2009/0262697 A1* | 10/2009 | To et al. | 370/329 |
| 2010/0151870 A1* | 6/2010 | Piercy et al. | 455/450 |
| 2011/0255514 A1* | 10/2011 | Olofsson et al. | 370/331 |
| 2011/0317574 A1* | 12/2011 | Richardson | 370/252 |

\* cited by examiner

TELECOMMUNICATIONS NETWORKS AND DEVICES

TECHNICAL FIELD

This application relates to a telecommunications network, including a radio access network for wirelessly transmitting between a mobile telecommunications device and a base station. More particularly, this application relates to a method and arrangement for managing communication access of a mobile device to one or more "Femto" or "Micro" base stations, which may be called Access Points (APs).

BACKGROUND

There have recently been proposals to allow access to the features and services provided by GSM and UMTS networks other than by accessing those networks in the conventional manner. In this regard, the conventional manner is by signalling between a mobile terminal and a conventional base station (macro base station) that has a dedicated connection to an MSC, and which provides coverage in the cell occupied by the mobile terminal using cellular telecommunication (e.g. GSM or UMTS) communication transport protocols. It has been proposed to increase network capacity and improve coverage by providing additional special base stations (femto to or micro base stations), also referred to as access points (APs), for example at a subscriber's home or office. It has also been proposed to use APs in the Long Term Evolution (LTE) telecommunications network currently being developed, but not yet implemented. LTE is likely to be the next network implementation after 3G.

An advantage of using an access point connected to the core network via ah IP network is that existing broadband DSL connections can be used to link mobile terminals with the network core without using the capacity of the radio access network or transmission network of a mobile telecommunications network. They therefore provide an infinitely cheaper point of access to mobile telecommunications networks than a standard Node B.

However, a disadvantage of these APs is that where there is overlap of coverage between the APs and the macro mobile telecommunications network, the APs can act as a source of interference and provide coverage holes in the macro network. There is therefore a need to minimise this interference by APs.

Further, APs may be sold as a commodity to be installed by end users with minimal instructions. It is therefore also beneficial that APs be easily configurable.

SUMMARY OF THE INVENTION

According, to a first aspect, the present invention provides a method of dynamically determining an output power level of an Access Point (AP) in a mobile telecommunications network, the method including: determining a parameter measurement relating to the distance a mobile terminal is from the Access Point; and using the determined parameter measurement to determine the output power level of the Access Point.

According to a second aspect, the present invention provides an Access Point (AP) configured to transmit an output signal in a mobile telecommunications network, the output signal intended for reception by one or more proximate mobile terminals, the Access Point including: parameter determination means configured to determine a parameter measurement relating to the distance a proximate mobile terminal is from the Access Point; and power level determination means configured to use the determined parameter measurement to dynamically determine a power level of the output signal of the Access Point.

According to a third aspect, the present invention provides a method of dynamically adjusting the output power level of an Access Point in a mobile telecommunications network, the method including: determining a measurement relating to one or more of the following parameters:
 a) a service type provided to the mobile terminal;
 b) the available downlink Dedicated Channel (DCH) power; and
 c) the available channel capacity.
 and selectively adjusting the output power level using the at least one determined measurements.

According to a fourth aspect, the present invention provides an Access Point configured to transmit an output signal in a mobile telecommunications network, the output signal intended for reception by one or more proximate mobile terminals, the Access Point including: parameter determination means configured to determine a parameter measurement relating to one or more of the following parameters:
 a) a service type provided to a proximate mobile terminal;
 b) the available downlink Dedicated Channel (DCH) power; and
 c) the available channel capacity;
and adjustment means configured to selectively adjust the output power level using the at least one determined parameter measurements.

In this way, the system described herein is able to provide an initial measured power output that meets the user's area coverage requirements and which is dynamically adjustable, up to a predetermined maximum. This balances the user's area coverage requirements with the need to minimise coverage hole interference.

According to a fifth aspect, the present invention provides a method of operating an Access Point in a telecommunications network in order to test the scope of its network coverage including: replicating a mobile telecommunications network by generating predetermined network parameters; communicating with a mobile terminal using the replicated parameters in order to allow a user of the mobile terminal to determine the scope of coverage provided by the Access Point.

According to a sixth aspect, the present invention provides an Access Point configured for use in a mobile telecommunications network including: means configured to replicate a mobile telecommunications network by generating predetermined network parameters; and means configured to communicate the replicated parameters to a mobile terminal in order to allow a user of the mobile terminal to determine the scope of coverage provided by the Access Point.

BRIEF DESCRIPTION OF THE DRAWINGS

Embodiments of the system described herein will now be described by way of example, with reference to the accompanying drawings, in which.

In the drawings like elements are generally designated with the same reference sign.

DETAILED DESCRIPTION

Figure 1:
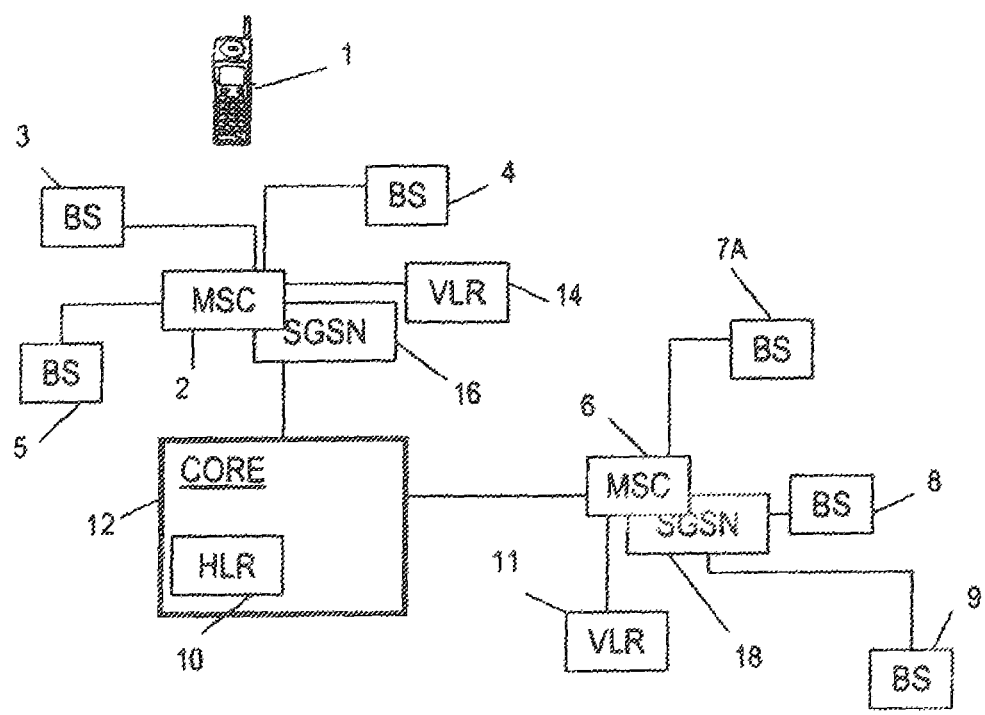
FIG. 1 is a diagrammatic drawing of certain elements of a mobile telecommunications network for use in explaining the operation of such a network in accordance with embodiments of the system described herein.

Certain elements of a mobile telecommunications network, and its operation, will now briefly be described with reference to FIG. 1.

Each base station (BS) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal, commonly referred to as User Equipment (UE), is shown at 1. The mobile terminal may be a handheld mobile telephone, a personal digital assistance (PDA) or a laptop computer equipped with a datacard.

In a GSM mobile telecommunications network, each base station comprises a base transceiver station (BTS) and a base station controller (BSC). A BSC may control more than one BTS. The BTSs and BSCs comprise the radio access network.

In a UMTS mobile telecommunications network, each base station comprises a node B and a radio network controller (RNC). An RNC may control more than one node B. The node Bs and RNCs comprise the radio access network.

In the proposed LTE mobile telecommunications network, each base station comprises an eNode B. The base stations are arranged in groups and each group of base stations is controlled by a Mobility Management Entity (MME) and a User Plane Entity (UPE).

Conventionally, in a GSM/UMTS network, the base stations are arranged in groups and each group of base stations is controlled by one mobile switching centre (MSG), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1. The base stations 3, 4, 5, 7, 8 and 9 each have dedicated (not shared) connection to their MSC2 or MSC6—typically a cable connection. This prevents transmission speeds being reduced due to congestion caused by other traffic.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is hot known to the subscriber. The subscriber is issued with a publicly known number, that is, the subscriber's telephone number, by means of which calls to the subscriber are initiated by callers. This number is the MSISDN.

The network includes a home location register (HLR) 10 which, for each subscriber to the network stores the IMSI and the corresponding MSISDN together with other subscriber data, such as the current or last known MSC or SGSN of the subscriber's mobile terminal.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 3 associated with the particular cell in which the terminal 1 is located. In a traditional network, the base station 3 then transmits this IMSI to the MSC 2 with which the BS 3 is registered.

In a network using the functionality described in 3GPP TS 23.236, the base station follows prescribed rules to select which MSC to use, and then transmits this IMSI to the selected MSC.

MSC 2 now accesses the appropriate storage location in the HLR 10 present in the network core 12 and extracts the corresponding subscriber MSISDN and other subscriber data from the appropriate storage location, and stores it temporarily in a storage location in a visitor location register (VLR) 14. In this way, therefore the particular subscriber is effectively registered with a particular MSC (MSC 2), and the subscribers information is temporarily stored in the VLR (VLR 14): associated with that MSC.

Each of the MSCs of the network (MSC 2 and MSC 6) has a respective VLR (14 and 11) associated with it and operates in the same way as already described when a subscriber activates a mobile terminal in one of the cells corresponding to One of the base stations controlled by that MSC.

The MSCs 2 and 6 support communications in the circuit switched domain—typically voice calls. Corresponding SGSNs 16 and 18 are provided to support communications in the packet switched domain—such, as GPRS data transmissions. The SGSNs 16 and 18 function in an analogous way to the MSCs 2 and 6. The SGSNs 16, 18 are equipped with an equivalent to the VLR for me packet switched domain.

From the description above, it will be understood that the coverage area of a mobile telecommunications network is divided into a plurality of cells, each of which is served by a respective base station. In order to allow a mobile terminal to maintain a call when the mobile terminal moves outside the coverage area of a cell, the call must be switched to an alternative cell automatically. The call must be routed to the new cell before handover can be effected whilst maintaining the connection with the old cell until the new connection is known to have succeeded.

The functionality just described may also apply to the proposed LTE mobile telecommunications network, with its eNode Bs performing the functionality of the base stations and the MME/UPE performing the functionality of the MSCs/VLRs. It is also to be appreciated that the functionality just described is one example of a network in which the embodiments of the invention may be implemented.

Figure 2:
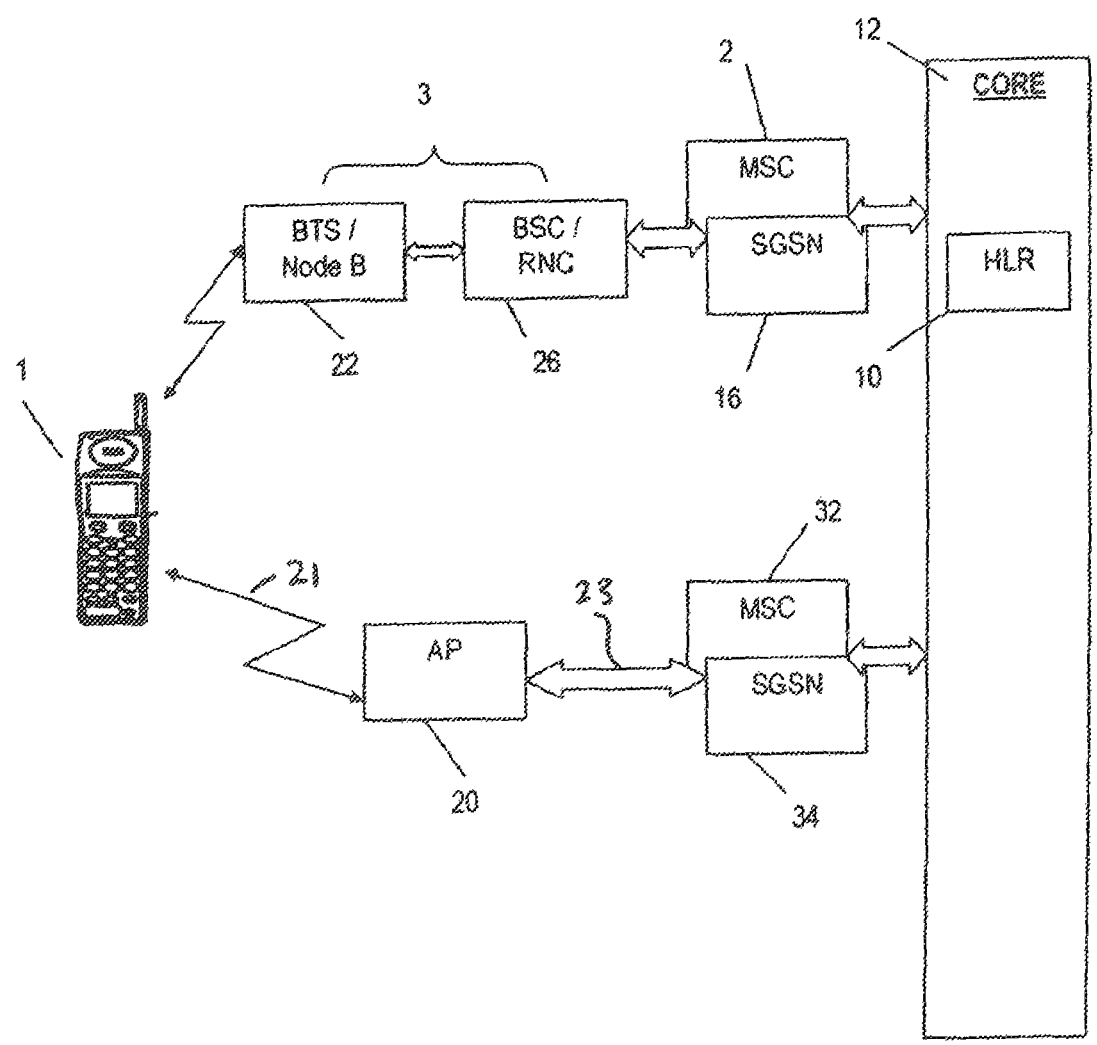
FIG. 2 shows a modified mobile telecommunications network for receiving IP based communications from an access point in addition to communications from a conventional base station according to an embodiment of the system described herein.

FIG. 2 shows elements for providing access to a GSM or UMTS network by both a conventional base station 3 and an access point (AP 20). The AP 20 provides a radio link 21 to mobile terminal 1.

The radio link 21 from the AP 20 to the mobile terminal 1 uses the same cellular telecommunication transport protocols as the conventional base station 3 but with a smaller range—for example 25 m. The AP 20 appears to the mobile terminal 1 as a conventional base station, and no modification to the mobile terminal 1 is required to operate with the AP 20. The AP 20 performs a role corresponding to that of a GSM BTS 22 and BSC 26 and/or UMTS Node B and RNC and/or an LTE Node B.

Communications between the access point 20 and the core network 12 are IP based communications, and may be, for example, transmitted over a broadband IP network (and routed via the Internet). The communications are routed via a concentrator (not shown) towards MSC 32 or SGSN 34. The access point 20 converts the cellular telecommunications transport protocols used between the mobile terminal 1 and the AP 20 to IP based signalling.

The connection 23 between the access point 20 and the core network 12 may use the PSTN telephone network. Typically a DSL cable connection connects the access point 20 to the PSTN network (a backhaul connection). The bandwidth of the cable connection between the access point and the telephone exchange is shared with multiple other users (typically between 20 and 50 other users).

The access point 20 may be connected to the core network 12 by means other than a DSL cable and the PSTN network. For example, the access point 20 may be connected to the core network 12 by a dedicated cable connection that is independent of the PSTN, or by a satellite connection between the access point 20 and me network core 12.

AP 20 would typically be configured to serve a Wireless Local Area Network (WLAN) located in a home or office, in addition to GSM/UMTS/LTE networks. The WLAN could belong to the subscriber of the mobile terminal 1, or be an independently operated WLAN. The owner of AP 20 can prescribe whether the AP is either open or closed, whereby an open AP is able to carry communications from any mobile device in the GSM/UMTS/LTE network, and a closed AP is only able to carry communications from specific pre-designated mobile devices.

With this background in mind, an implementation of the first embodiment of the invention will now be described, which seeks to minimise interference caused by APs.

There is a need to balance the two conflicting factors of the power of the AP to provide coverage across the whole of the subscriber's home/office, and the coverage holes generated; on the macro network by high power outputs from the AP. For example, −10 dBm transmitted power an AP would struggle to provide good coverage across the whole of a house, and at +15 dBm the AP will cause significant coverage holes on the macro network, especially when the AP is at significant distance from the macro Node B. While fixing the transmitted power to a level between these two is a possibility, this is not an optimal solution.

For instance, if a relatively low fixed output power setting is used, while there would be low interference levels for neighbouring APs, and the localized "dead zone" would be constrained to a small area, there is likely to be insufficient coverage for a large house/office. This problem is particularly disadvantageous for the users of the AP when used in an area where the macro network coverage is poor.

Contrastingly, were a relatively high fixed output power setting be used, while there would be good coverage and call quality for the users of the AP, there is likely to be an unduly high interference level imposed upon neighbouring APs and an increased "dead zone" in the macro network.

A first embodiment of the invention addresses these issues by introducing a dynamically determined transmitted/output power level of the AP dependent on factors relating to the locality of its user or users. For instance, where a user initiates a call, or is paged to receive a call, and that user is close to the AP hub, then the output power of the AP will be set to a lower level. However, where the user is at the outer bounds of the user's property, then the output power of the AP will be set to a higher level.

Preferably this output power level is taken as the power used by the Common Pilot Channel (CPICH). In this regard. It is the power output by the CPICH that, is dynamically determined.

According to this first embodiment of the invention, the initial output power is preferably determined based upon the Uplink Signal quality during call set up. This can be determined from the Received Signal Code Power (RSCP) and the initial Ec/Io in the Random Access Channel (RACH) message "RRC Connection Setup". In this regard the RACH is the channel used for uplink transport in UMTS and the Ec/Io is a notation used to represent a dimensionless ratio of the average power of the RACH, to the total signal power. Ec/Io is typically measured and reported by the UE for the P-CPICH of the cell in the "RRC Connection request" Message. An equation that may be used to calculate Ec/Io is:

$$Ec/Io = RSCP/RSSI \quad (1)$$

where RSSI is the Received Signal Strength indication.

Further, Ec/Io is preferably calculated using the link budget, which takes into account all of the gains and losses from the transmitter, across the wireless interface to the receiver, such that:

$$\text{Received Power} = \text{Transmitted Power} - \text{losses} + \text{gains} \quad (2)$$

More precisely, the following equations may be used to make the initial output power determination ($P\_CPICH_{(new)}$) of the Common Pilot Channel (CPICH):

$$P\_CPICH_{(new)} = P_{Estimate} + \text{AlgoDelta} \quad (3)$$

where $$P_{Estimate} = P\_CPICH_{(old)} + \text{InitialDLEcIoTarget(RB)} / \text{InitialDLSIR(RB)} - \text{CPICH\_Ec/Io} \quad (4)$$

such that
   AlgoDelta is a fixed offset relating to the Radio Bearer being used between the AP and the UE; and
   $P\_CPICH_{(old)}$ is the last output power determination of the Common Pilot Channel of the cell;
   InitialDLEcIoTarget(RB) is the Initial Downlink Ec/Io Ratio Target of the Radio Bearer;
   InitialDLSIR(RB) is the Initial Downlink Signal to Interference Ratio in respect of the Radio Bearer. This value is changed dependent on the Radio Bearer concerned; and
   CPICH_Ec/Io is the ratio of the average power of the CPICH, to the total signal power.
   $P_{Estimate}$ is a measurement based on the distance the UE is away from the AP.

In this way, only as much power as the user requires is used by the AP in establishing the communication with the user.

While this approach is fine if the user stays in the one position, if the user moves away from the AP hub, then it is likely that their communication will drop out, or need to be handed over to a macro Node B, if one is available.

Therefore, according to a further embodiment of the invention, once the output power level is determined, it is only set initially, so that subsequently it is dynamically adjusted from its initial output power level, in order to meet the needs of the user moving about their home/office. The adjustments are preferably calculated based upon service type, downlink Dedicated Channel (DCH) power and/or the available capacity. For instance, if the service to be provided to the user is the download of a large capacity file, then a stronger signal may be allowed of the AP than if the user was partaking in a voice call. Similarly, if the channel capacity was reduced due to another user using HDSPA, then the AP will be allowed only a lower level output signal.

One approach for dynamically adjusting the output power level is to use equations (3) and (4), whereby each current output power determination ($P\_CPICH_{(new)}$) becomes the old output power value ($P\_CPICH_{(old)}$) in the subsequent calculation.

Preferably, the output power level always meets the following conditions:
   Adjustments to the power level shall always be within the Max P_CPICH and Min P_CPICH values. These maximum and minimum values are at least initially configured before the users obtain and install their APs; and a Only positive increases to the computed power value are considered.

An equation which illustrates how the dynamic adjustment may be implemented is as followed:

$$\text{Computed power} = \text{P-CPICH}_{(new)} + \text{Dynamic Offset} \quad (5)$$

where $$\text{Dynamic offset} = \text{Function}(\text{DCH}_{Power(RB)}) \quad (6)$$

And where the newly computer power is greater than the previous Value of the output power, then the dynamic offset will be implemented.

Figure 3:
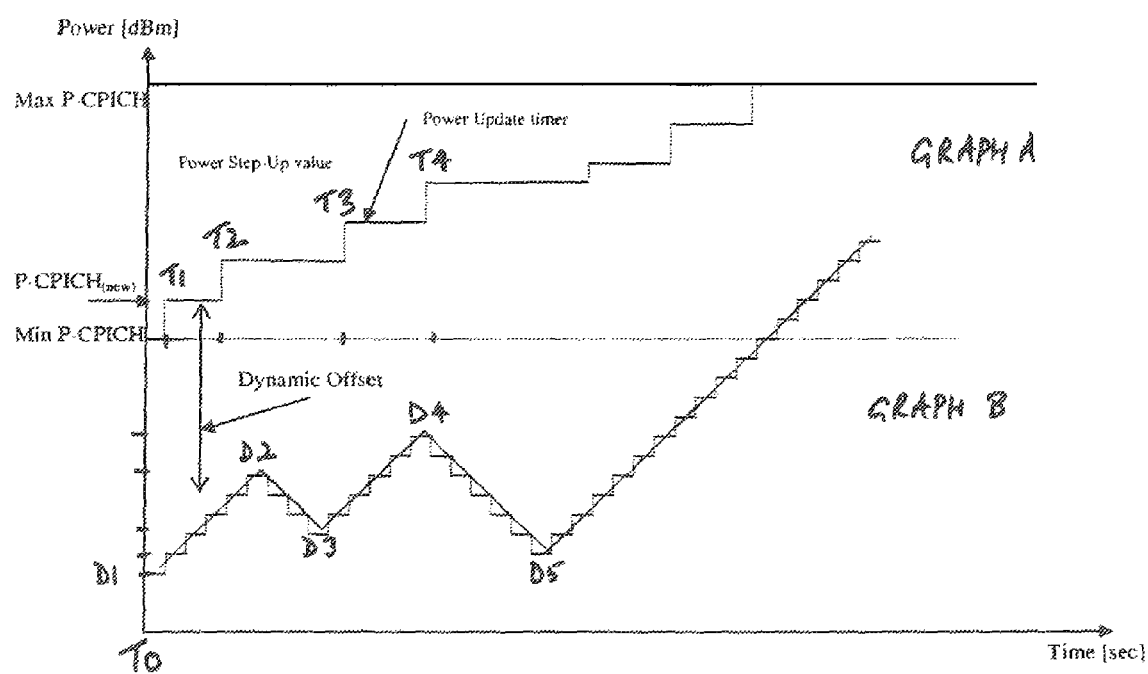
FIG. 3 illustrates a graph contrasting a user's varying distance from an AP hub (bottom graph) with the dynamically allocated downlink power (top graph).

The effect of this dynamic adjustment embodiment of the invention is shown in FIG. 3. Graph A shows power versus time measurements, and Graph B shows distance from the AP versus time measurements.

In relation to Graph B, it is to be appreciated that the distance parameter need not be solely based upon actual distance from the AP, but may also take into account other environmental factors, such as interference from macro networks and degradation of the coverage due to wall penetration. In other words, a clear line of sight distance of D1 will require less AP output power than a distance of D1 through a thick wall.

At time zero, the initial output power determination takes place when the user is a distance of D1 meters from the AP hub. The AP will also set the transmitted CPICH power to a range rather than a fixed value to ensure that interference is minimised. In this regard, the maximum output power is Max P_CPICH and the minimum power is Min P_CPICH. There are various ways in which these values can be determined.

For instance, the AP can estimate the approximate output power required to cover a given area by monitoring the statistics when the UE makes RACH accesses for the cell. Over time, the statistics will build up a picture of the most common locations in which UEs access the AP cell and hence allow for the best maximum and minimum settings of CPICH power for that location. The AP could also use Continuous Quality Improvement (CQI) considerations and/or variable Offsets in addition to the RACH access statistics.

Alternatively or in addition, the AP could track statistics for different times of the day and different days to ensure that the appropriate power usage was based upon more detailed measurements.

As a further alternative, the appropriate maximum and minimum AP power levels could also be based upon the received power from the macro network. Alternatively, the levels could simply be set; by the operator as fixed values.

In relation to the example illustrated in FIG. 3, however, in a still further alternative; the initial output power is taken as the minimum power (Min P_CPICH) transmitted by the AP Hub while it remains active. Ideally, the CPICH coverage should not be reduced below the minimum value so as to allow other UEs to move into the cell, and in order to provide a minimum coverage level.

The power range can be an extended range when there are no UEs in the cell making use of the AP, but reduced in size when a user becomes active to ensure that no more than the minimum required power for the service is used.

Again referring to graph B of FIG. 3, from time zero the UE is moved away from the AP at a steady pace until it reaches a distance D2.

During this time, with reference to Graph A, at time T1, a power update has occurred. This power update has computed a positive dynamic offset taking into consideration the parameters relating to the distance that the UE is away from the AP. The positive dynamic offset has resulted in a step up of the output power level of the AP. This step up can be a set incremental step or can be specially determined based upon the heeds of the greater distance.

A timer is preferably used to initiate each power update calculation. However, as an alternative, the AP or the UE may monitor the signal strength of their communications, and initiate an update when required. For instance, an update may be required when the signal strength dips below a predetermined threshold.

Similarly at time T2, before the UE reaches distance D2, the AP performs another update and since the UE has moved a still greater distance from the AP since the last power update, and positive dynamic offset has again been returned, the AP output power is increased.

Referring again to Graph B, once the UE has reached distance D2, the UE is then moved back closer towards the AP to a distance D3, which is inbetween D1 and D2. The UE then stops decreasing the distance, and commences moving further away to distance D4, which is beyond distance D2.

During this time when the UE is reducing the distance between it and the AP, no power updates occur as the current level of power is sufficient for the UE. It is to be appreciated mat during this reducing of distance phase, the AP output power level is maintained at the maximum level reached, and not reduced at all. This allows other UEs to commence using the AP at the same time, without experiencing any degradation of service.

The AP power output is next increased at time T3. This occurs at a point when the UE has just started increasing the distance from the UE beyond D3, toward D4. This point is in fact a lesser distance than the last point at which a power level increase occurred, which indicates that other factors are affecting the signal level, such as the physical layout of the premises, the available DCH power and/or the available capacity.

Referring again to Graph A, at time T4, corresponding to the time when distance D4 is reached, a further AP power increase occurs. At this point in time, D4 is the furthest point: reached beyond the AP. From point D4, the UE again reduces the distance from the AP to distance D5, which is a distance only marginally greater than the initial starting distance D1. During the transition from distance D4 to distance D5, no reduction in power level occurs, and it stays at the last level determined.

From point D5, the UE starts a long but constant move away from the AP. The AP implements several output power increments until it reaches its Max P_CPICH. No further increments are possible beyond this maximum. Therefore, since the UE continues to move away from the AP once this maximum is reached, the connection with the AP with eventually either drop out, or the AP be handed over to an alternative AP or macro Node B.

In this way, the AP is able to automatically configure itself to operate with appropriate power and parameterisation with far less input than a traditional Base Station, which is particularly beneficial.

In a further embodiment of the invention, a technique/arrangement is provide which allows a subscriber to obtain a reliable indication of the maximum coverage possible from an AP device installed within their premises. In this regard, the technique enables a test call set up to be performed. A particular benefit of this approach is that subscribers will have a reliable indication of the operating areas they can expect from their AP device, and therefore should reduce the number of help desk calls related to coverage problems, as the subscriber is provided with a self check mechanism.

In this regard the test mode may be implemented at initialisation of the AP and/or on demand from the subscriber.

The subscriber preferably initiates the test mode, such as by pushing a start button on the AP. Preferably is a visual indicator is provided to show that the test mode is active. In this mode the AP will generate a "fake" network with predetermined parameters, such as the Network Code, Pilot Power and selected Absolute Radio Frequency Channel Number (AFRCN).

The user then involves their UE by initiating a network search mode to find the "fake" network. Once located, the user selects the network, which attaches the UE to the AP in test mode.

The user then is able to survey their environment, such as by walking about different areas of their premises, in order to determine if and where the AP is providing coverage.

In this test mode, the user is also able to imitate a test call at required limits of coverage. From this test call, the AP would be in a position to analyse the signal received from the UE to establish maximum Pilot Power requirements.

In the embodiments described above, the AP is configured to appear to the UE as a conventional base station that communicates with the UE using GSM/UMTS/LTE protocols in accordance with the Standards (where they exist) and the licensed radio spectrum. Alternatively, the AP could communicate with the UE by any purer suitable technology—for example, by a Bluetooth (®) connection, WiFi or another unlicensed mobile access (UMA) protocol, which allows the GSM/UMTS/LTE features to be provided using a non-GSM/UMTS/LTE bearer technology.

The above described embodiments have also assumed that all APs in the network require access to them to be controlled, however it is also within the scope of this invention that only a subset of all the APs are controlled.

It is also to be appreciated that the above embodiment can be considered separately or in combination.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of dynamically determining an output power level of an access point in a mobile telecommunications network, the method comprising:
    determining a first parameter measurement relating to a distance a mobile terminal is from the access point;
    using the first parameter measurement to determine an initial setting of the output power level of the access point; and
    the access point selectively dynamically adjusting the output power level of the access point from the initial setting based upon a second parameter measurement relating to a service type provided to the mobile terminal, wherein the output power level of the access point is adjusted differently when the service type is a voice call than when the service type is a data transmission.

2. The method of claim 1, wherein the first parameter measurement is a measurement relating to received signal code power from the mobile terminal.

3. The method according to claim 1, wherein the second parameter measurement further relates to the available downlink dedicated channel power.

4. The method according to claim 1, wherein the second parameter measurement further relates to the available channel capacity.

5. An access point configured to transmit an output signal in a mobile telecommunications network, the output signal intended for reception by one or more proximate mobile terminals, the access point comprising:
    a parameter determination device configured to determine a first parameter measurement relating to a distance a proximate mobile terminal is from the access point;
    a power level determination device configured to use the first parameter measurement to dynamically determine an initial setting of a power level of the output signal of the access point; and
    an adjustment device configured by the access point to selectively dynamically adjust the output power level from the initial setting based upon a second parameter measurement relating to a service type provided to the mobile terminal, wherein the output power level of the access point is adjusted differently when the service type is a voice call than when the service type is a data transmission.

6. The access point of claim 5, wherein the first parameter measurement determined by the parameter determination device is a measurement relating to received signal code power from the proximate mobile terminal.

7. The access point of claim 5, wherein the power level determination device is further configured to determine a maximum and a minimum output power level, and the adjustment device is further configured to ensure that all adjustments of the output power level are maintained at or between these levels.

8. The access point of claim 5, wherein the parameter determination device is further configured to gather statistics relating to one or more locations of the proximate mobile terminal when in communication with the AP, and the power level determination device is further configured to use the statistics in determining appropriate maximum and minimum output power level settings for each of the one or more locations.

9. The access point of claim 5, wherein the parameter determination device is further configured to gather statistics relating to at least one of: a time of day and a time of week when the proximate mobile terminal is in communication with the AP, and the power level determination device is further configured to use the statistics in determining appropriate maximum and minimum output power level settings for the at least one of: the time of day and the time of week.

10. The access point according to claim 5, wherein the second parameter measurement further relates to the available downlink dedicated channel power.

11. The access point according to claim 5, wherein the second parameter measurement further relates to the available channel capacity.

* * * * *